(12) United States Patent
Sattler et al.

(10) Patent No.: US 7,542,156 B2
(45) Date of Patent: Jun. 2, 2009

(54) REMOTE PRINTING METHOD AND SYSTEM

(75) Inventors: Juergen Sattler, Wiesloch (DE);
Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 937 days.

(21) Appl. No.: 11/026,049

(22) Filed: Jan. 3, 2005

(65) Prior Publication Data

US 2006/0146358 A1 Jul. 6, 2006

(51) Int. Cl.
*G06F 3/12* (2006.01)
*G06K 15/00* (2006.01)

(52) U.S. Cl. ...................................... 358/1.14; 358/1.15

(58) Field of Classification Search .................. 358/1.1, 358/1.14, 1.15, 1.16, 1.18
See application file for complete search history.

(56) References Cited

U.S. PATENT DOCUMENTS 6,307,640 B1 * 10/2001 Motegi ....................... 358/1.14

| 2003/0182438 | A1 * | 9/2003 | Tenenbaum | 709/232 |
| 2004/0196486 | A1 * | 10/2004 | Uchino | 358/1.14 |
| 2005/0046880 | A1 * | 3/2005 | Asai et al. | 358/1.6 |
| 2006/0092452 | A1 * | 5/2006 | Simpson | 358/1.14 |
| 2006/0146358 | A1 * | 7/2006 | Sattler et al. | 358/1.14 |

FOREIGN PATENT DOCUMENTS

JP 02003242118 * 8/2003
JP 02005071271 * 3/2005

* cited by examiner

*Primary Examiner*—Jerome Grant, II
(74) *Attorney, Agent, or Firm*—Kenyon & Kenyon LLP

(57) ABSTRACT

A remote printing system and method is provided. A server on a first private network may receive a request from a user that has performed a login procedure of the first private network, the request requesting the printing of a document to a specified printer. The first private network may determine that the printer is located on a second private network that has a login procedure that is separate from the login procedure of the first private network. The first private network may then reformat the print request and the document from a format native to the first private network to a format that is recognized by a module at the second private network, and may send the reformatted document and the reformatted print request to the second private network.

22 Claims, 6 Drawing Sheets

PRINTER TABLE 201

| PRINTER | ID | PERMISSIONS |
|---------|-----|-------------|
| | | |

NETWORK PRINTERS 214

REMOTE PRINTERS 218

FIG. 2

REMOTE PRINTING METHOD AND SYSTEM

BACKGROUND

Traditionally, a sender delivers documents to a remote recipient through mail services, such as a postal service or a mail courier. However, these are slow and costly methods of delivery. To reduce delivery time, senders began using facsimile machines to send documents. This method however is also costly, ties up telephone lines, and can be particularly slow for large documents. In some cases, the document sizes are limited by the facsimile machine's memory space. With the advent of the Internet, documents are now predominately sent through email, which is faster and less expensive than the other methods. However, email delivery can be a problem, particularly for large documents, because email memory space is limited. Moreover, the email recipient must access the recipient's electronic mailbox, open the document, and then print it on the recipient's local printer, all of which take valuable time.

To avoid these problems, there is a need in the art for an inexpensive and fast method for remote document delivery.

BRIEF DESCRIPTION OF DRAWINGS

FIG. 2 is a simplified block diagram of a table of printers that are available on a network according to an embodiment of the present invention.

DETAILED DESCRIPTION OF EMBODIMENTS

The present invention provides a method and system for remotely printing documents at a recipient's printer as a way to quickly and inexpensively deliver the documents to the remote recipient. In some embodiments, a sender on a first private network delivers a document to a recipient on a second private network by causing the document to be printed on the second private network. The first and second private networks may be operated by separate business entities. Embodiments of the present invention advantageously provide an inexpensive and quick method for the sender at the first entity to deliver a document to the recipient at the second entity. It may be understood that the examples discussed below are for illustration purposes only and are not intended to limit the configuration to that shown.

Figure 1:
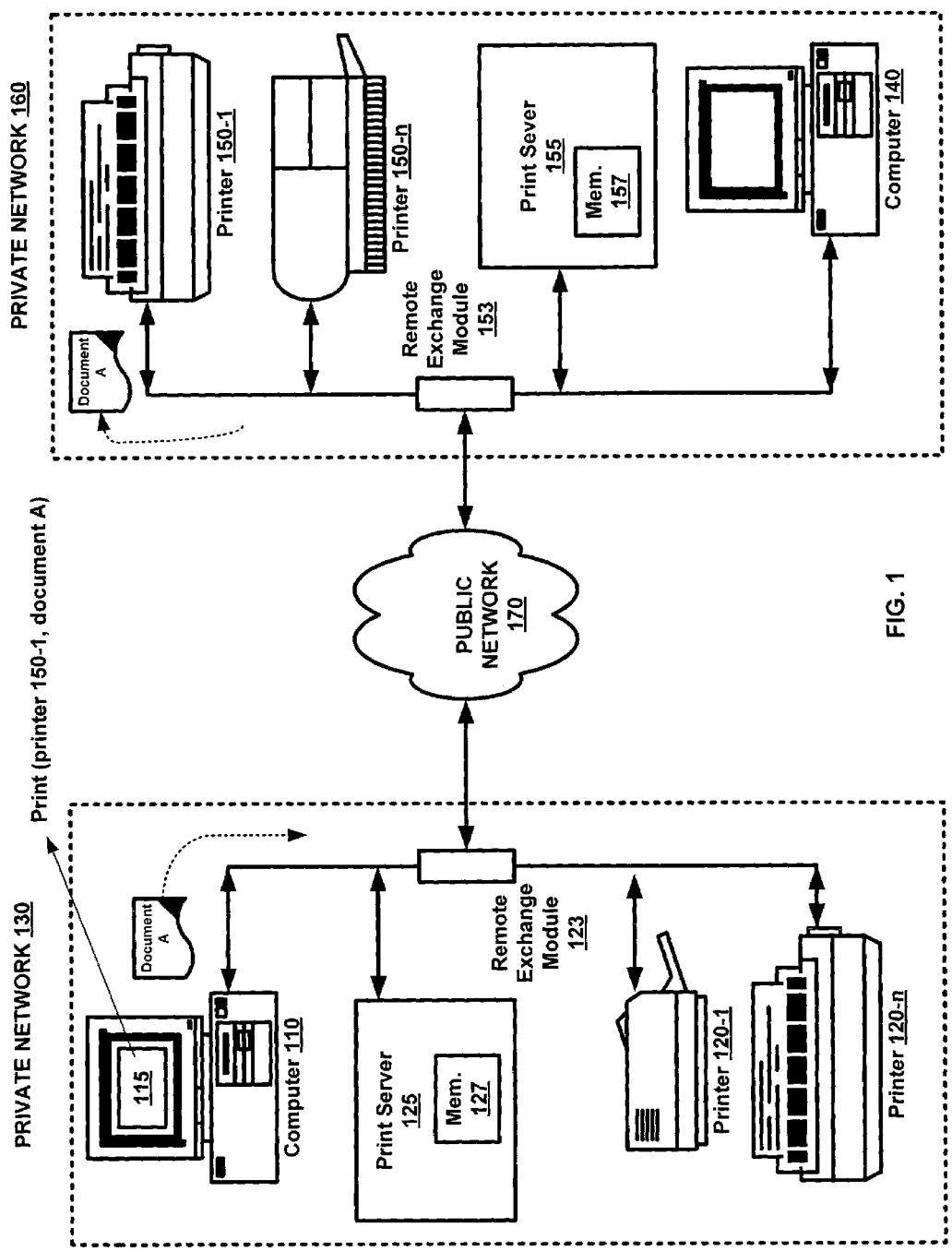
FIG. 1 is simplified block diagram showing two private networks executing an embodiment of the present invention.

FIG. 1 is simplified block diagram which shows two private networks executing an embodiment of the present invention. FIG. 1 includes private network 130 and private network 160 that are coupled together over public network 170. Networks 130 and 160 may be local area networks (LANs) or wide area networks (WANs), connecting a collections of computers, printers, and other devices, and may each be located at a single site or multiple sites. Networks 130 and 160 are typically operated by individual business entities. For example, network 130 may be the internal private network of Acme Co., and network 160 may be the internal private network of XYZ Corp. Public network 170 may be a publicly accessible network such as the Internet. Networks 130 and 160 may ordinarily impede direct public accessibility with respective firewalls, except for limited access through public network 170 for such functions as email, website access, etc. For example, network 130 may prevent anyone who is not generally authorized to use network 130 from accessing most resources (such as processors, printers, etc.) or documents on network 130, although an individual who is not authorized to use network 130 may still be able to perform functions such as sending email to network 130. Typically, a user of a private network may be able to use that network only if that user has performed a login procedure (which generally requires a user name and password). Typically, prior to the present invention, only a user who is logged into a network may print to a printer on that network. Each private network may have a separate login procedure. A user may login to a private network remotely, by using a workstation that is on the network, or by any other appropriate method.

Network 130 may include computer 110, printers 120-1 through 120-n, and print server 125, all connected via transmission wires, wireless technology, or any other media capable of transmitting data. Network 160 may include computer 140, printers 150-1 through 150-n, and print server 155, all connected via transmission wires, wireless technology, or any other media capable of transmitting data. Computers 110 and 140 may be any type of devices for running application software, such as, for example, a personal computer, a terminal, a personal digital assistant (PDA), etc. Printers 120 and 150 may be any type of devices for reproducing copies of documents, such as, for example, an inkjet printer, a laser printer, a copier, a facsimile machine, a scanner, a multipurpose machine, etc. Print servers 125 and 155, having respective memory 127 and 157 for storing printer data, may be any type of devices for handling print requests or print jobs. Memory 127 and memory 157 may be any type of mediums capable of storing instructions and of being read by a machine, such as a compact disk, hard drive memory, floppy disk memory, DVD-ROM, CD-ROM or any type of machine-readable (computer-readable) storing medium. Memory 127 and memory 157 may store a set of instructions that may be included within a computer program (which as is well known comprises a plurality of instructions) that is executable by a computer system.

Optionally, print servers 125 and 155 may connect to other devices capable of sending and receiving print commands and data. For example, print servers 125 and 155 may connect to a database processor that transmits print data between a database and the print servers.

As shown in FIG. 1, computer 110 contains a user interface 115 for an application program that may be executing on computer 110. For example, user interface 115 may be the user interface for an application program such as Microsoft Word®, Adobe Acrobat®, Lotus Notes®, etc. In an embodiment, a sender may be able to print a document from user interface 115 to a selected printer. FIG. 1 shows document A, which may be a document that is in a format recognized by private network 130 and by the application which generates user interface 115. In embodiments of the present invention, a user of computer 110 (which may be referred to as a sender) may initiate a request to print document A to a printer on network 160, such as by using the command "Print (printer 150-1, document A)" shown in FIG. 1.

In an embodiment of the present invention, networks 130 and 160 may exchange printer data through respective network exchange modules, for example. Network exchange modules 123 and 153 may provide routines to convert incoming data into a format compatible with the associated private network. For example, networks 130 and 160 may have incompatible native formats such as for print request formats and document formats. For example, private network 130 may use a version of the Microsoft Windows NT® operating system, and documents and print requests may use the protocols and format provided for that operating system, while private network 160 may use an operating system such as Novel NetWare® or Unix, which may have different protocols and formats, or may supports files that use an Oracle Corporation file format, an Lotus Notes® file format, etc. Accordingly, when a print request is sent from one network to the other, the receiving network's exchange module may convert the incompatible requests and documents into formats recognized by the receiving network. An example of a network exchange module is SAP's Exchange Infrastructure (XI) software.

FIG. 2 is a simplified block diagram of a table of printers available on a network according to an embodiment of the present invention. Printer tables 201 may reside in memory 127 and/or 157 of respective print servers 125 and 155.

Printer table 201 may list network printers 214 and remote printers 218 available for printing. For example, printer table 201 on network 130 may list network printers 120-1 through 120-n and remote printers 150-1 through 150-n. Similarly, printer table 201 on network 160 may list network printers 150-1 through 150-n and remote printers 120-1 through 120-n. A printer may be said to be remote to a network if the printer is not on the network. The table may include a description of the printer, an identifier recognized by the print server, access permissions for the printer, and status information for that printer, such as whether the printer is on-line or busy and the printer's list of waiting jobs. For example, in printer table 201 on network 130, an entry for printer 120-1 may include a printer description, such as "4th floor laser printer," an identifier, such as "4LP," and access permissions, such as allowing access from remote network 160, allowing access from network 130, denying access from all other remote networks, etc.

Printer table 201 may be a dynamic list created and/or updated at regular intervals or, for status information, as events occur. Printer table 201 may include only available printers or, alternatively, all printers whether available or not with some availability indicator.

Figure 3:
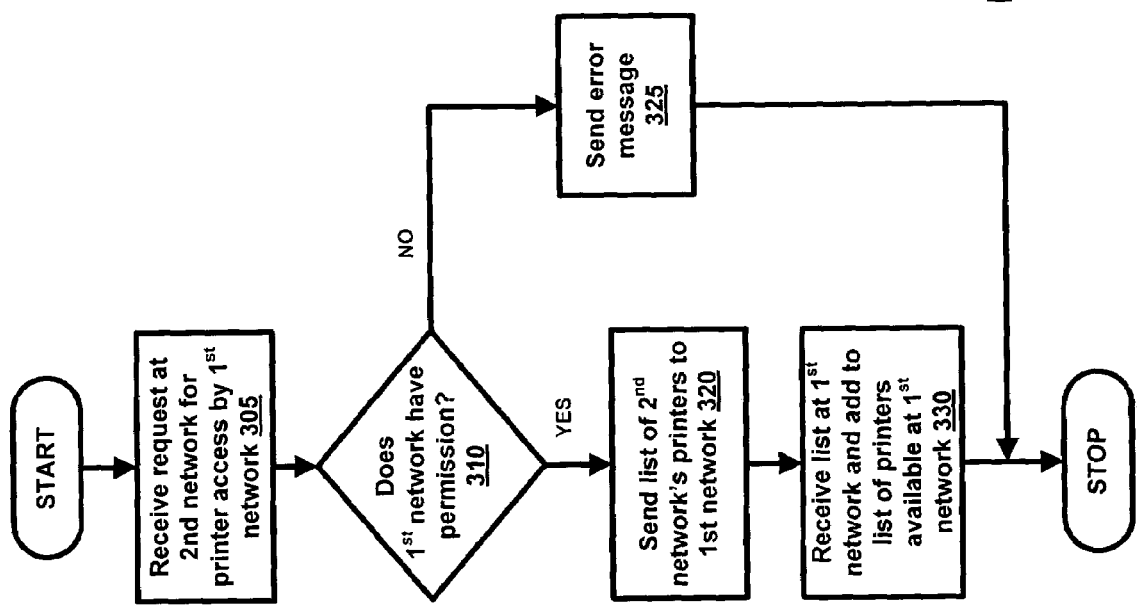
FIG. 3 is a flowchart of a method of configuring a private network for remote printing according to an embodiment of the present invention.

FIG. 3 is a flowchart of a method of configuring a private network for remote printing according to an embodiment of the present invention. In this method, print server 155 may perform an administrative function to identify the printers on network 160 that are available to network 130 for remote printing. Network 160 may receive a request for printer access from network 130 (305). Print server 155 on network 160 may determine whether network 130 has permission to access printers 150 on network 160 (310). To do this, print server 155 may look up the permissions listed in printer table 201 resident in memory 157.

Permissions may be provided if a user of network 160 sends a request to the administrator of network 160 requesting that the permissions by granted. Such a request typically would include information identifying the outside user's computer. Of course, the permissions may be for limited access (e.g., print only) to protect the security of the network. In some embodiments, the administrator of network 160 may grant remote printing permissions to all users of network 130. In some embodiments, the administrator of network 160 may grant remote printing permission only on one or more printers on network 160.

If network 130 does not have permission to access printers 150, print server 155 may send an error message to network 130 (325).

If any of printers 150 are available, print server 155 may send a list of the available printers to network 130 (320). Alternatively, print server 155 may send a list of all printers with an indicator of whether the printer is available. Network 130 may then receive the list of remote printers that are available to network 325 (330).

In an alternate embodiment, network 130 may have permission to access only certain printers 150 on network 160. In this case, print server 155 may send (320) a list of only those printers for which network 130 has permission to access.

Figure 4:
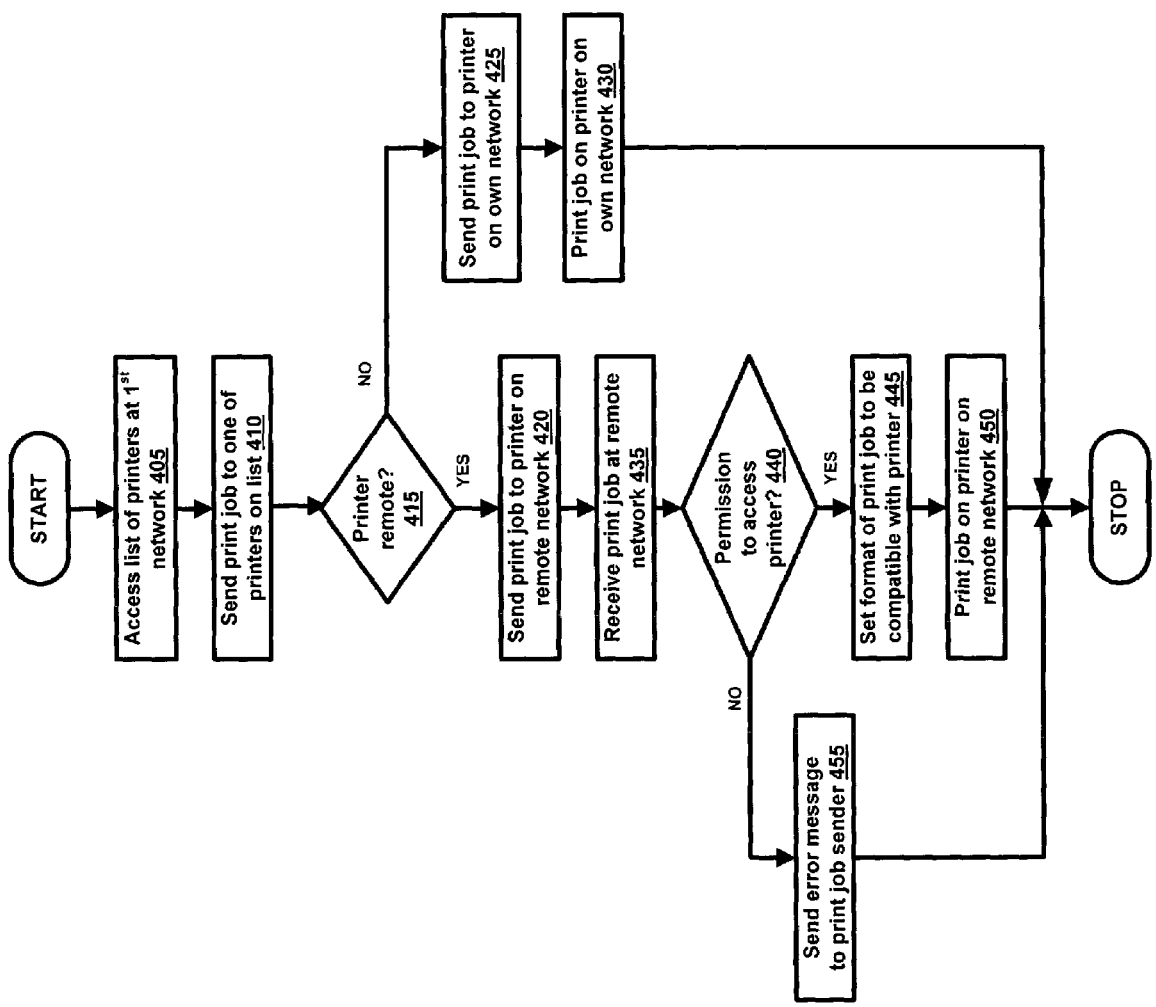
FIG. 4 is a flowchart of a method of remotely printing a document according to an embodiment of the present invention.

FIG. 4 is a flowchart of a method of remotely printing a document according to an embodiment of the present invention. The method shown may be performed, for example, by private network 130 and private network 160 after they have been configured for remote printing as discussed above with reference to FIG. 3. For example, print server 125 on network 130 may have received a list of available printers from print server 155 on network 160, and this list of remote printers may have been made available to users of network 130. In the method shown in FIG. 4, a sender (or user) at computer 110 on a remote network may access a list of remote printers that are accessible to that sender from that private network (405). For example, the sender at computer 110 may determine, through application user interface 115, that printer 150 on network 160 is available to that sender. The sender may have received printer table 201 from print server 125. After accessing the list, the sender may send a print job or request to one of the printers on the list upon which to print sender's document (410). For example, the sender at computer 110 may send the command "Print (printer 150-1, document A)" as shown in FIG. 1. As with all commands on the private network, this print command may be received by the applicable print server on that private network (e.g., print server 125), which may determine whether the selected printer is a network printer (i.e., a printer on that private network) or a remote printer (i.e., a printer on another network) (415).

If the selected printer is a network printer, the print job and document may be sent to the selected printer on that network (425) and may be printed on that printer (430). For example, print server 125 may send the print job to printer 120-1. If the selected printer is a remote printer, the print server may forward the print request and document to the remote network (420). This may be done by forwarding the print request and document to a remote exchange module (such as remote exchange module 123), which may convert the print job and document to a format for transmission to the other private network and may transmit the print job to that other private network. For example, print server 125 may send the print job to remote exchange module 123, which may convert the print job to a message in a common format (e.g., a common format recognized by other remote exchange modules) and may transmit the message over public network 170 to private network 160.

When a private network receives a remote print job (435), it may determine whether the sender has permission to print to the printer on the selected printer (440). For example, remote exchange module 153 may receive the message (which contains a request from the sender at computer 110 to print document A to printer 150-1) from remote exchange module 123, and remote exchange module 153 may determine whether the sender has permission to print to printer 150-1. If the sender does not have permission to print to the printer on the selected printer, an error message may be generated and sent back to the sender (455). If the sender does have permission to print to the printer on the selected printer, the print request may be formatted into a format recognized by the remote network (445). For example, remote exchange module 153 may convert the print request and document from a transmission format into a format that is recognized by private network 160. The print job may then be sent to the appropriate printer for printing (450). For example, remote exchange module 153 may forward the converted print request to printer server 155, which may forward document A and print request to printer 150-1, which may print document A.

Conversely, private network 160 may be the sending network and private network 130 may be the receiving network, in which case print server 125 may perform the administrative function as shown in FIG. 3 and print server 155 the print job function as shown in FIG. 4.

In an alternate embodiment, the sender may select a printer that is assigned to a particular user on a second network, rather than a particular printer. Print server 125 or printer server 155 may then determine which network printer is the default printer for that user and may send the document to the determined printer.

Figure 5:
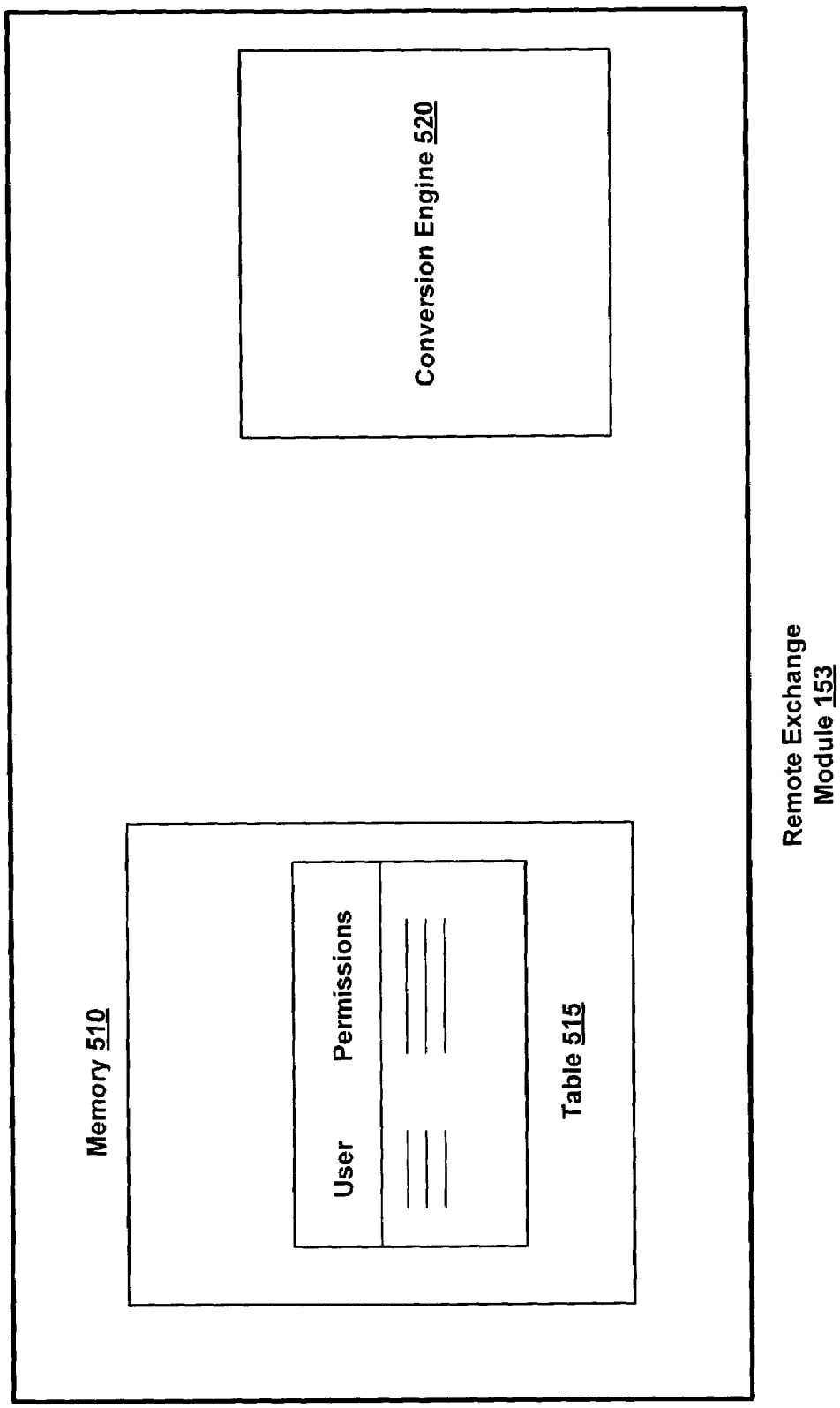
FIG. 5 is a simplified block diagram of a remote exchange module according to an embodiment of the present invention.

FIG. 5 is a simplified block diagram of a remote exchange module according to an embodiment of the present invention. FIG. 5 shows remote exchange module 153 as containing a memory 510 and a conversion engine 520. Memory 510 may be a computer readable medium as discussed above with reference to memory 127. In the embodiment shown, memory 510 stores a table 515 that may be used to determine if an outside party has permission to access resources on the network where the remote exchange module resides. For example, if remote exchange module 153 were to receive a message indicating that a sender at computer 110 (on network 130) is sending a print job to printer 150-1 (on network 160), remote exchange module 153 may use table 515 to determine whether that sender has permission to print to printer 150-1. In some embodiments, an administrator of a private network may provide permissions to outsiders (i.e., people who are not users of the network) to access network resources by updating table 515.

Conversion engine 520 may be used to convert commands and/or documents into a format recognized by the network upon which remote exchange module 153 is operating. For example, conversion engine 520 may be a software module that converts a print request received from remote exchange module 123 into a format recognized by private network 160. If private network 160 is running the Novel NetWare® operating system, for example, then the document and command may be converted to a format recognized by the Novel NetWare® operating system. In an embodiment, remote exchange module 153 may convert outgoing messages into a common format that can be recognized by another remote exchange module (e.g., remote exchange module 123) so that each remote exchange module would only need to be able to convert to and from this common format and the format of the network upon which they are resident.

Figure 6:
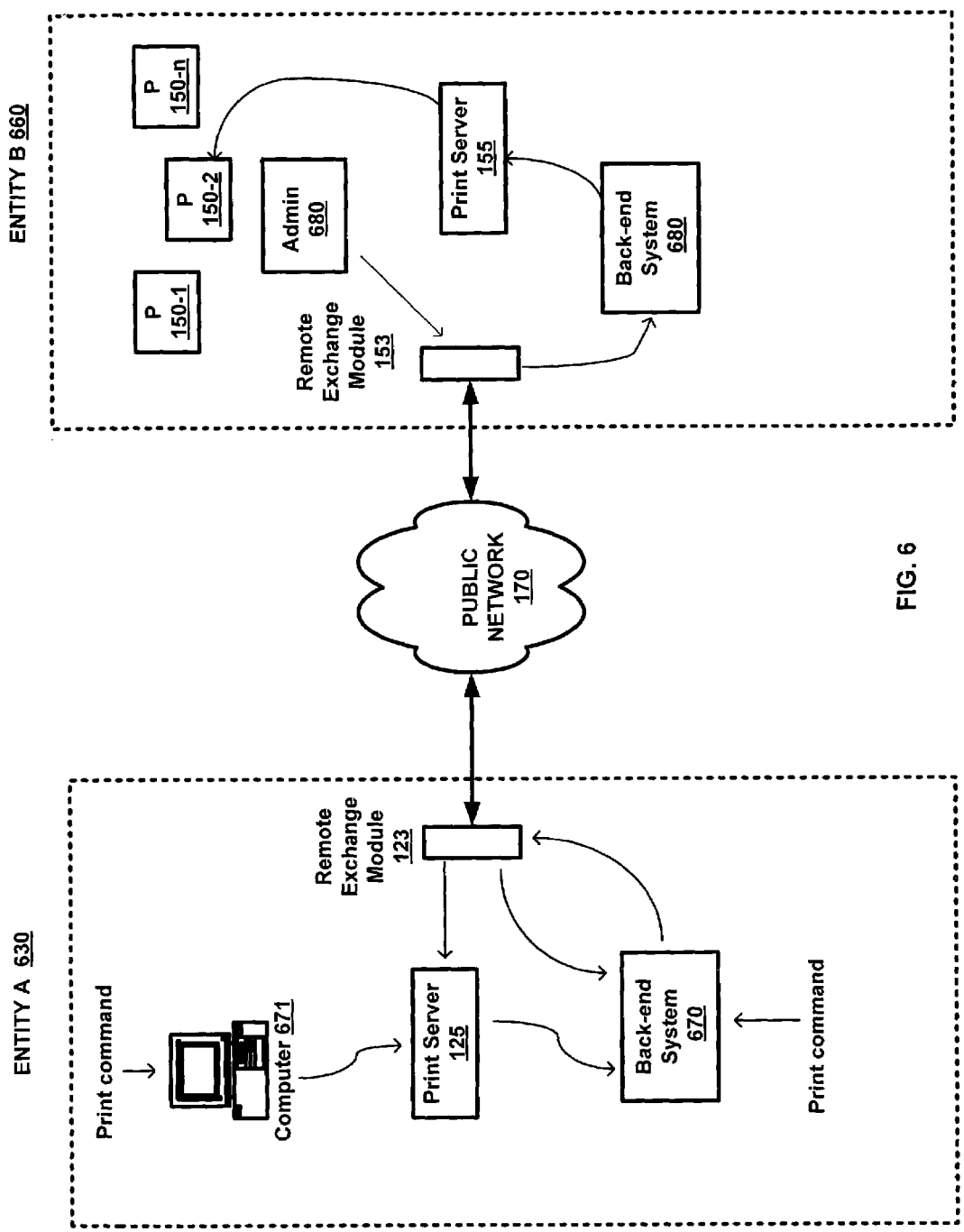
FIG. 6 is simplified block diagram showing two private networks executing another embodiment of the present invention.

FIG. 6 is simplified block diagram showing two private networks executing another embodiment of the present invention. FIG. 6 shows and entity A 630 and entity B 660, which may each be operating private networks as discussed above, coupled together through public network 170. As shown, entity A's private network includes a computer 671, print server 125, remote exchange module 123, and back-end system 670. Computer 671 may be coupled to print server 125, which may be coupled to remote exchange module 123 and back-end system 670. As shown, entity B's private network includes a remote exchange module 153, back-end system 680, print server 155, and printers 150-1 to 150-n. Remote exchange module 153 is coupled to back-end system 680, which is coupled to print server 155, which is coupled to printers 150-1 to 150-n. Back-end system 670 and 680 may be, for example, a Customer Relationship Management System, a Human Resources System, or any other type of system that processes data on the back-end, such as an SAP System 7 or any SAP back-end system.

According to the embodiment shown, an administrator 680 of entity B's private network may customize remote exchange module 153 to deploy one or more of printers 150-1 to 150-n so that users of entity A's private network may print to those printers. Remote exchange module 153 may then transmits the configuration information to remote exchange module 123 on entity A's private network, and remote exchange module 123 may distribute the configuration information about the printers to printer server 125 and back-end system 670. In some embodiments, the configuration message that is sent may be similar to a message that is sent to add a new printer to the private network. Thus, for example, printer 150-2 may be added to the list of printers available at print server 125.

According to the embodiment shown, a user on entity A's private network may send a request to print a document on printer 150-2 to an application (e.g., Microsoft Word®) that is executing on computer 671. Computer 671 may then send a print request to printer server 125, which may determine that the requested printer (150-2) is on a remote network and forward the print command to back-end system 670. A special print driver may be used to send the print command to the back-end system. As another example, a user at a user interface of the back-end system may send a request to print a document to printer 150-2. The document to be printed, and the print request, may then be sent by back-end system 670 to remote exchange module 153, which may forward the request to remote exchange module 153 on entity B's private network. Remote exchange module 153 may then send the document and the print request to back-end system 680, which may forward the request to print server 155, which may send the request to printer 150-2. According to such embodiments, internal communication with the remote exchange modules may generally be made by the back-end systems, which may result in implementation efficiencies.

The above is a detailed discussion of the certain embodiments. It may be understood that the examples discussed are for illustration purposes only and are not intended to limit the configuration to that shown. It is of course intended that the scope of the claims may cover other embodiments than those described above and their equivalents.

What is claimed is:

1. A method comprising:
receiving a request to print data using a specified printer at a server on a first private network from a user whose authorization to access a printing resource on the first private network has been verified, where the user has selected the specified printer from a list containing one or more printers on one or more private networks;
determining whether the printer is located on a second private network, wherein the second private network requires separate authorization to access a printing resource on the second private network;
if the printer is located on the second private network, reformatting the print request and the data from a format native to the first private network to a second format that is recognized by a module at the second private network; and
sending the reformatted print request and data from the first private network to the second private network to be printed.

2. The method of claim 1, wherein before receiving the request from the user, the user had selected the specified printer from a list of available printers that is maintained by the server on the first private network.

3. The method of claim 2, wherein the specified printer requested was previously added to the list of available printers based on a message received at the first private network indicating that the user has permission to print to that printer.

4. The method of claim 1, wherein the method further comprises receiving a message from the second private network that indicates that the data has been printed at the specified printer.

5. The method of claim 1, wherein the format native to the first private network is one of a Windows format, a UNIX format, or an Oracle format.

6. The method of claim 5, wherein the format that is recognized by a module at the second private network is a format recognized by an SAP Exchange Infrastructure module.

7. The method of claim 1, wherein the printing resource is a print server or printer.

8. A method comprising:
receiving at a second private network a request from a first private to print data using a specified printer at the second private network selected from a list containing one or more printers on one or more private networks, wherein the printer at the second private network is not available to the first private network without the second private network having granted authorization to access a printing resource on the second private network;
determining at the second private network whether the first private network has authorization to access the printing resource on the second private network; and
if the first private network has authorization printing the data from the first private network at the printer on the second private network.

9. The method of claim 8, further comprising:
sending an error message to the first private network if the first private network does not have permission to access a printer on the second private network.

10. The method of claim 8, wherein said determining is made based on whether a print permission indication was set for the first private network by an administrator of the second private network.

11. The method of claim 8, wherein the method further comprises:
sending from the second private network to the first private network a list of printers on the second private network 12. The method of claim 11, wherein said receiving further comprises reformatting the data and the print request from a format that is recognized by a module at the second private network to a format native to the second private network.

13. A machine readable medium storing a set of instructions, the set of instructions capable of being executed by a processor to implement a method comprising:
receiving a request to print data using a specified printer at a server on a first private network from a user whose authorization to access a printing resource on the first private network has been verified, where the user has selected the specified printer from a list containing one or more printers on one or more private networks;
determining whether the printer is located on a second private network, wherein the second private network requires separate authorization to access a printing resource on the second private network;
if the printer is located on the second private network, reformatting the print request and the data from a format native to the first private network to a second format that is recognized by a module at the second private network; and sending the reformatted print request and data from the first private network to the second private network to be printed.

14. The machine readable medium of claim 13, wherein before receiving the request from the user, the user had selected the specified printer from a list of available printers that is maintained by the server on the first private network.

15. The machine readable medium of claim 14, wherein the specified printer requested was previously added to the list of available printers based on a message received at the first private network indicating that the user has permission to print to that printer.

16. The machine readable medium of claim 13, wherein the method implemented further comprises receiving a message from the second private network that indicates that the document has been printed at the specified printer.

17. A machine-readable medium storing a set of instructions, the set of instructions capable of being executed by a processor to implement a method comprising:
receiving at a second private network a request from a first private network indicating that a user of the first private network whose authorization to access a printing resource on the first private network has been verified has requested that data be printed on a specified printer on the second private network selected from a list containing one or more printers on one or more private networks;
determining at the second private network whether the user has separate authorization to access a printing resource on the second private network; and
if the user does have said print permission, printing the data at the specified printer.

18. The medium of claim 17, wherein the printing resource is a print server or printer.

19. The method of claim 17, wherein said receiving further comprises reformatting the data and the print request from a format that is recognized by a module at the second private network to a format native to the second private network.

20. The machine readable medium of claim 17, wherein the method implemented further comprises:
receiving at a second private network a request from a third private network for access to a printer at the second private network, wherein printers at the second private network are not available to users who have neither logged in to the second private network nor been given print permission;
determining at the second private network whether any users of the third private network have permission to print to a printer on the second private network; and
if any users of the third private network have permission to print to a printer on the second private network, sending from the second private network to the third private network a list of printers on the second private network.

21. The machine readable medium of claim 20, wherein the method implemented further comprises:
sending an error message to the third private network if the none of the users on the third private network has permission to access a printer on the second private network.

22. The machine readable medium of claim 17, wherein said determining is made based on whether a print permission indication was set for this user by an administrator of the second private network.

* * * * *